Dec. 7, 1948.    R. A. LARSON    2,455,785
APPARATUS FOR LACQUER COATING
SIDE SEAMS OF CAN BODIES
Filed Dec. 8, 1944    3 Sheets-Sheet 1
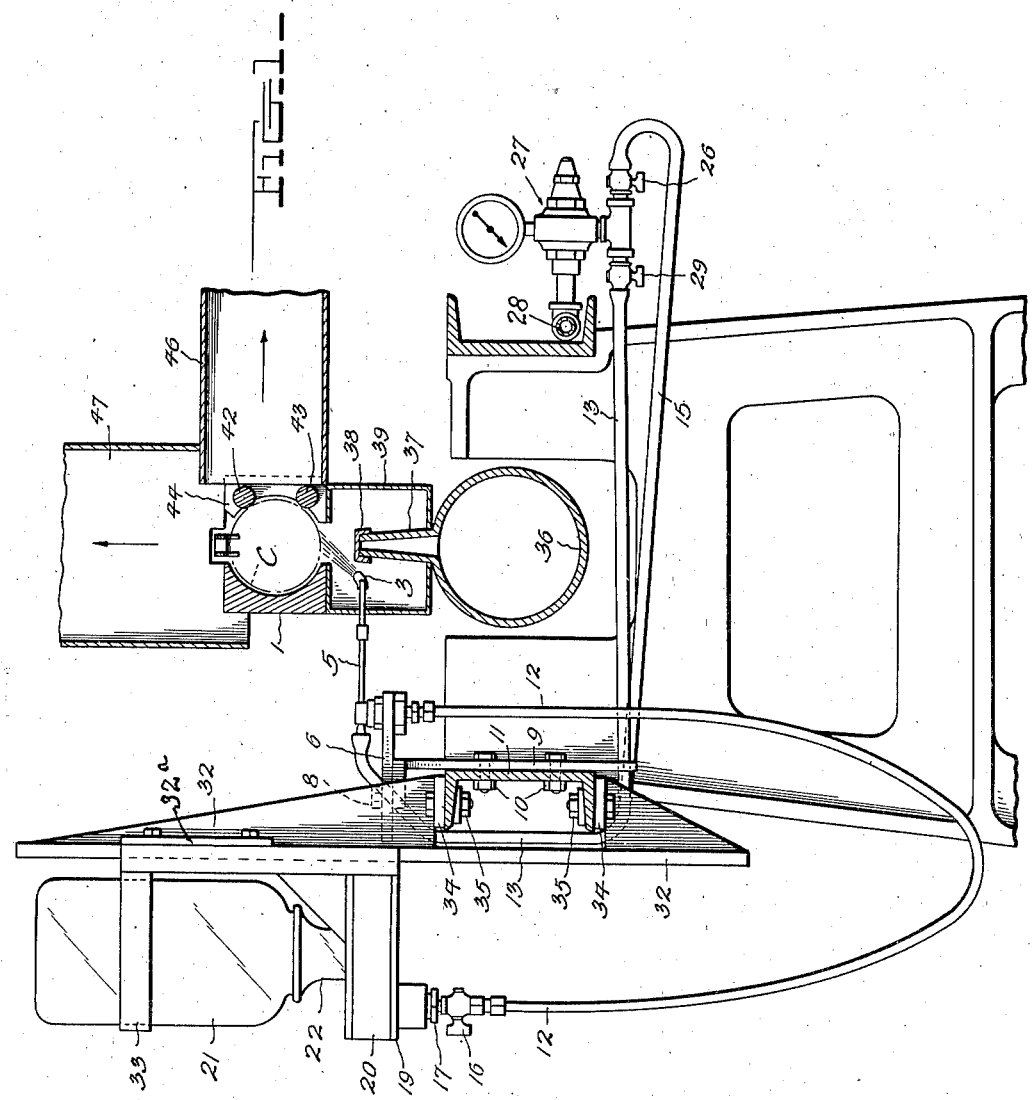
Inventor
Ralph A. Larson.
By Mason, Porter & Diller
Attorneys Dec. 7, 1948.　　　R. A. LARSON　　　2,455,785
APPARATUS FOR LACQUER COATING
SIDE SEAMS OF CAN BODIES
Filed Dec. 8, 1944　　　3 Sheets-Sheet 2
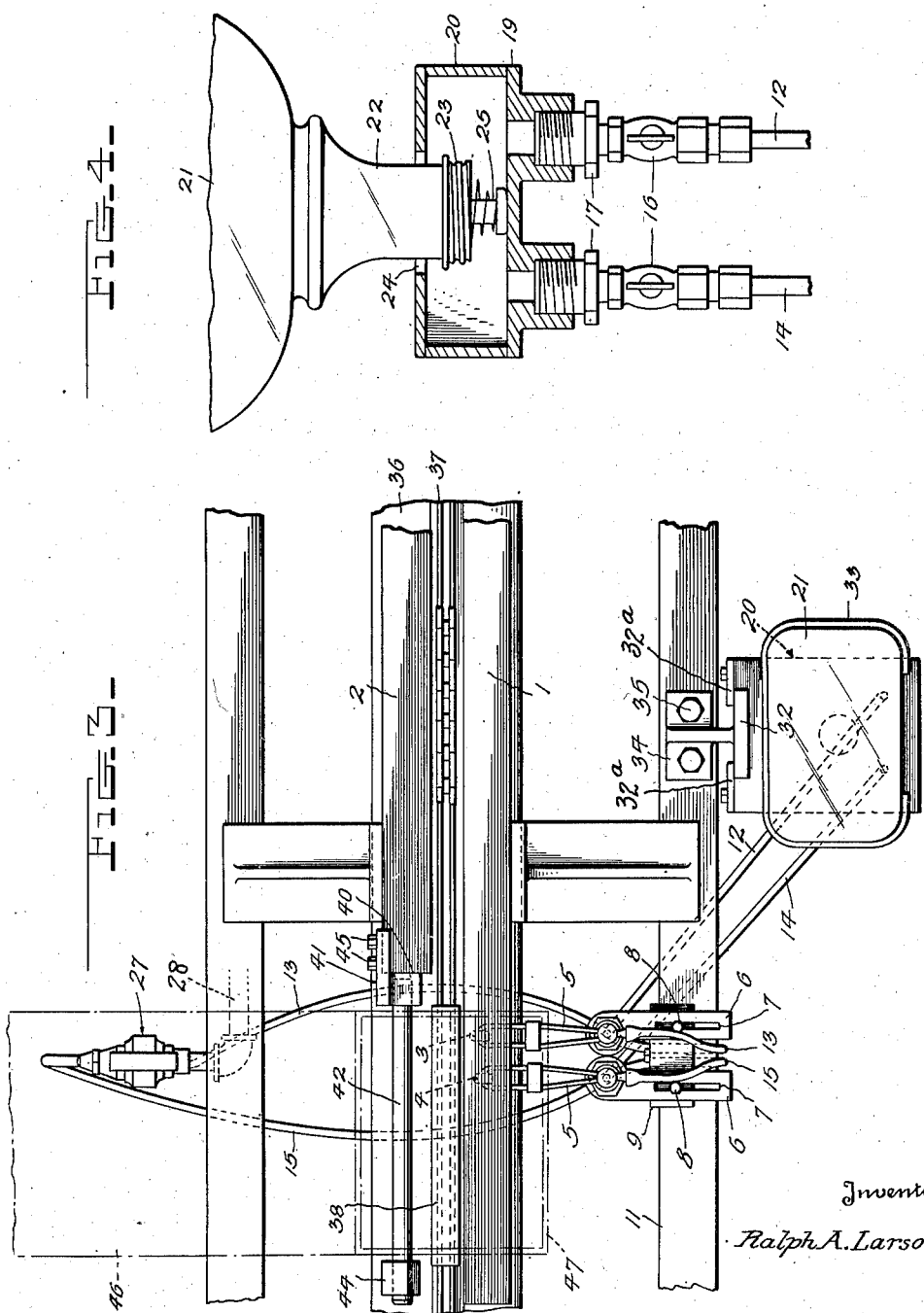
Inventor
Ralph A. Larson.
By Mason, Porter & Diller
Attorneys

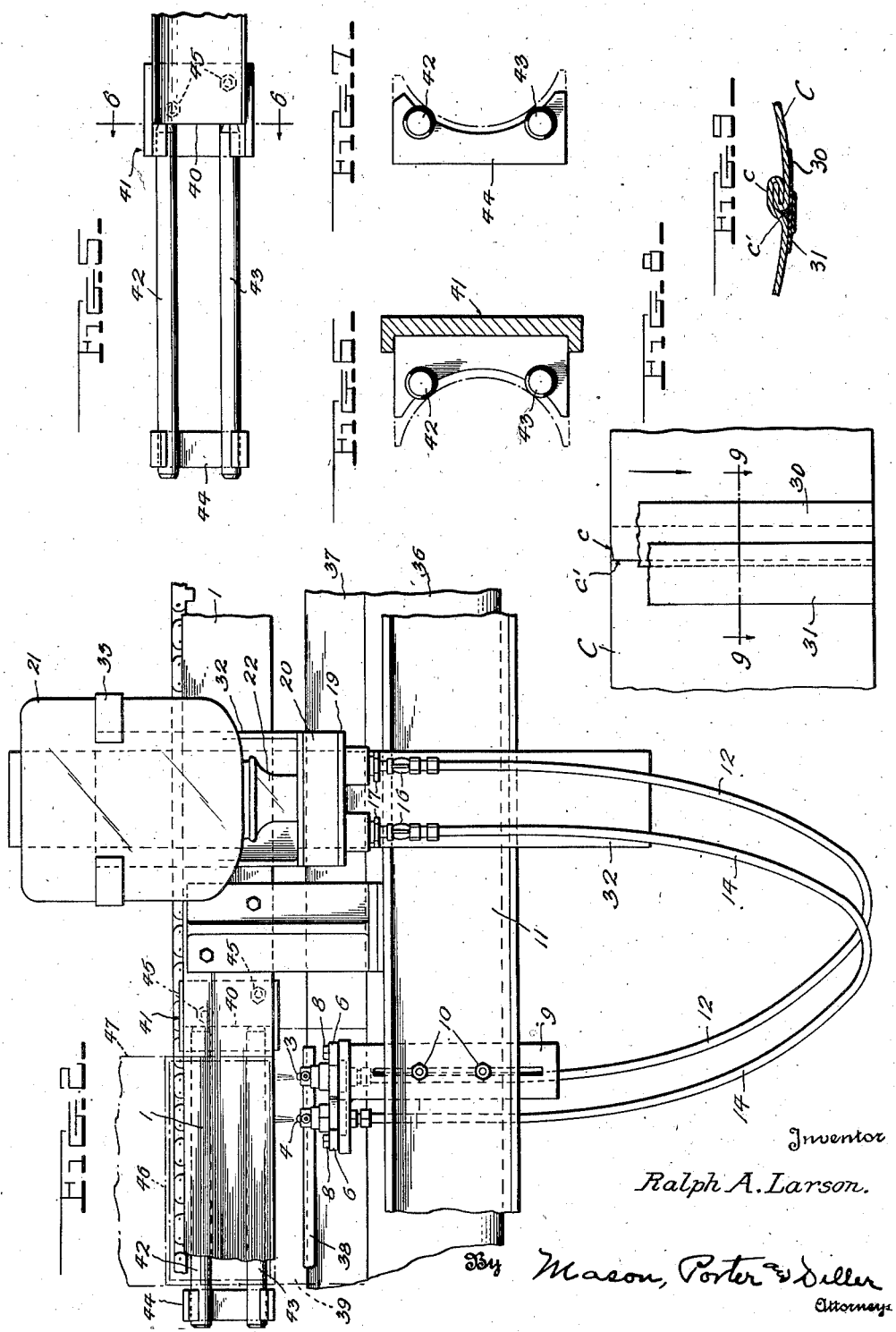

Patented Dec. 7, 1948

2,455,785

UNITED STATES PATENT OFFICE 2,455,785

APPARATUS FOR LACQUER COATING SIDE SEAMS OF CAN BODIES

Ralph A. Larson, Chicago, Ill., assignor to Continental Can Company, Inc., New York, N. Y., a corporation of New York Application December 8, 1944, Serial No. 567,180

8 Claims. (Cl. 91—45)

The invention relates to new and useful improvements in an apparatus for coating the outer face of the side seam area of a can body. It is well known that when either silver lead or other high melting point low-tin content solders are used in soldering hot dipped or electro tinplate, outside side seam rusting and discoloration will occur more rapidly under some conditions of processing, as well as when cans are in storage before and after processing, than when either the lower melting point high-tin content, tin lead solders are used. This more rapid rusting is due mainly to the removal from or the disturbance of the tin coating on the tinplate at the solder cut area during the soldering and wiping because of the lower melting point of the tin coating than the solder which is being applied thereto.

An object of the invention is to provide an apparatus for applying a protective lacquer coating to the solder cut area of the side seam of a can body as said body leaves the solder applying section of the body maker.

A further object of the invention is to provide an apparatus of the above type wherein the protective lacquer coating is applied by spraying devices.

A still further object of the invention is to provide an apparatus of the above type wherein two separate spray nozzles are utilized and are so positioned that the coating placed on the can body by one nozzle extends from the seam opening to the left thereof while the coating applied by the other nozzle extends from the seam opening to the right thereof, thus completely covering the solder cut area and the lapping of the coatings at the seam opening.

A still further object of the invention is to provide an apparatus of the above type wherein the solder horse is so constructed as to prevent the accumulation of lacquer on the inside of the horse due to the spray contacting therewith between passing can bodies.

These and other objects will in part be obvious and will in part be hereinafter more fully disclosed.

In the drawings:

Figure 1 is a view partly in transverse section and partly in elevation showing an apparatus embodying the invention as applied to a body maker, only certain essential parts of the body maker being shown;

Figure 2 is a side elevation of a portion of the essential features of the body maker with the improved lacquer applying apparatus applied thereto;

Figure 3 is a view showing more or less diagrammatically and in plan a section of the body maker with the improved lacquer applying apparatus attached thereto and also showing the modified form of horse used with the lacquer applying apparatus;

Figure 4 is an enlarged transverse sectional view through a portion of the lacquer applying apparatus showing the reservoir for supplying lacquer to the spray nozzles;

Figure 5 is an enlarged detail of a section of the horse which guides the can bodies through the solder applying section of the body maker;

Figure 6 is a sectional view on the line 6—6 of Figure 5;

Figure 7 is an end view of the solder horse shown in Figure 5;

Figure 8 is a view showing more or less diagrammatically a can body having the protective lacquer coating in part applied thereto and showing the manner in which these coatings are placed relative to the side seam and are lapped one upon the other;

Figure 9 is a sectional view on the line 9—9 of Figure 8 and showing the lacquered coatings on a much enlarged scale in order to illustrate the overlapping of the coatings and the extent of the area coated thereby.

The invention has to do with an apparatus applied to the body maker for spraying the outer surface of the can body in the region of the side seam just prior to the discharge of the can body from the solder horse associated with the can body soldering machine. The can body maker is of the usual type in which the can bodies are formed from blanks having hooks which are interlocked to form a side seam. These interlocked hooks are bumped and then the can body is passed over a solder roll rotating in a bath of solder. The solder roll extends lengthwise of the bath and the can body side seam is guided by an outside horse so that the side seam engages the solder coating lifted from the bath by the solder applying roll. This is such a common type of body making solder applying machine that it was not thought necessary to disclose the machine in any great detail.

The solder horse which guides the can body over the solder bath is formed in two sections. The two sections are spaced away from each other at the lower side so as to expose the side seam for the application of solder to the outer face of the side seam. The upper edge portions of the solder horse are also spaced away from each other so as to permit the feed dog to contact with and move the can bodies through the horse. The can bodies move in succession one after the other through the solder horse and solder is applied to the side seam thereof. The can bodies are spaced a slight distance from each other as they pass through the solder horse. These features of construction are also of the usual character and detailed disclosure thereof is not thought necessary.

In the drawings there is shown a portion of the usual frame structure of a can body making machine. Supported on this frame structure in the usual way is a solder horse which includes a section 1 and associated therewith is a section 2. The adjacent inner faces of these sections of the solder horse are curved to conform to the shape of the can body, one of which is indicated at C. The side seam of the can body is indicated at c. This side seam is at the lower side of the can body and is exposed between the two lower edge portions of the solder horse sections.

The invention has to do particularly with the coating of the side seam area of the can body as it leaves the discharge end of the solder horse. As shown in the present illustrated embodiment of the invention, there are two spray nozzles 3 and 4. These spray nozzles are identical in construction and a brief description of one will answer for the other. The spray nozzle is carried by tubular members indicated at 5 in Figure 1 and is capable of adjustment so that the spray nozzle may be set at a desired angle for directing the spray against the side seam of the can body. This spray nozzle is located as shown in Figure 1, to the left of the vertical plane passing through the side seam.

The tubular members 5 are adjustably secured to a bracket arm 6 (see Figure 3). This bracket arm has a slot 7 therethrough and a bolt 8 secures the bracket arm to a plate 9 which in turn is secured by bolts 10, 10 to the inner face of the side member 11 of the frame of the machine. The nozzle 3 is supplied with lacquer from a pipe 12 and is supplied with air under pressure from a pipe 13. The spray nozzle 4 is supplied with lacquer from a pipe 14 and with air under pressure from a pipe 15.

The lacquer pipes 12 and 14 are respectively attached to ordinary hand-controlled valves 16, 16 which are in turn threaded into adaptors 17, 17 connected to a supporting plate 19 on which is mounted a reservoir 20 for the lacquer. The lacquer is supplied to the reservoir from a container indicated at 21 which, as shown, is in the form of a bottle having a neck 22. A valve cap 23 is secured to the bottle after which the bottle is inverted and the neck inserted through the opening 24 leading to the tank. The stem of the valve 25 contacting with the bottom of the reservoir will open the valve so that the lacquer in the bottle will flow into the tank, filling the same to a predetermined level. As the lacquer is drawn from the tank more lacquer will be supplied thereto from the bottle and thus the level maintained in the reservoir. This manner of feeding lacquer and fluxes to a point of application is of the usual construction and further detailed description thereof is not thought necessary.

The air pipe 15 is connected through a hand-operated valve 26 to an air regulator 27 which in turn is connected to a pipe 28 leading to a source of air under pressure. The pipe 13 is connected through a hand-operated valve 29 to this air regulator. When the hand valves controlling the supply of lacquer and air are opened, then lacquer will be sprayed from the nozzle in a continuous spray in the usual manner.

In Figure 8 of the drawing the can body is indicated at C. The side seam which is of the usual interlocked hook construction is indicated at c. The seam opening at the outer face of the can body is indicated at c'. The can body passes through the body maker in a direction indicated by the arrow in Figure 3. The spray nozzle 3 is adjusted so that it forms a stripe which is indicated at 30 in Figure 8. This coating stripe extends from an area slightly to the left of the seam opening c', as viewed in Figure 8, to a considerable distance on the right away from the seam opening. The spray nozzle 4 forms a stripe 31 which extends from an area slightly to the right of the seam opening c' to a considerable distance on the left away from the seam opening. These stripes overlap at the seam opening and extend throughout the width of the area where the heat of the solder is likely to disturb the tin coating. Thus it is that a protective coating is applied to the side seam which will completely cover the portions which have heretofore rusted during processing or storing. This overlapping of the coatings is accomplished by the placing of the front spray nozzle so that it is nearer to the body maker than the rear spray nozzle, as shown in Figure 3.

The reservoir 20 for the lacquer is carried by a standard 32. The container 21 is retained on the usual support associated with the reservoir by a band 33. The standard 32 is rigidly secured to plates 34 which extend over the flanges of the frame member 11 and are secured thereto by bolts 35, 35. These are strengthening webs between the standard and the plates 34 which will give rigidity to the support for the lacquer container and reservoir.

Extending underneath the horse is the usual manifold 36 having an upwardly extending nozzle 37 for directing air against the side seam after the solder has been applied thereto for the cooling of the same. In the region of the spray nozzles 3 and 4 the nozzle 37 for the cooling air is closed by a suitable cap 38. A rectangular housing 39 encloses the nozzles 3 and 4 so that air blown against the side seam in the regions where the nozzle is not capped will not disturb the direction of the spray.

In order to prevent the inside of the horse from being coated with the spray between passing can bodies, the righthand side of the horse, as viewed in Figure 1, has been cut away or modified in construction. The usual horse section terminates at 40 (see Figure 5) and attached to this cut-off end of the horse is a bracket member 41 carrying two rods 42, 43. These rods extend throughout the region of the application of the spray to the side seam. The outer ends of the rods are connected by a supporting member 44 which holds the rods in accurate alignment. The bracket member 41 is bolted to the horse by suitable bolts 45, 45. These rods 42, 43 are so positioned that the can body which is guided by the inner surface of the two sections of the horse will make line contact with the rods and the can body will thus be guided by the rods plus the solid section of the horse opposed thereto during the spraying of the side seam. In the space between can bodies where the spray does not contact with a can body, it will pass out between the rods 42 and 43. Any spray accumulating on the rods which make line contact with the can body will not interfere with the proper guiding and travel of the can body.

A hood 46 is placed at the side of the horse containing the rods 42, 43 and this hood leads to a suction apparatus which will draw the volatile fumes of the spray out of the horse between the passing can bodies. There is also a hood 41 connected to a suitable exhaust which covers the horse in the region of the spraying so as to further collect and carry away any fumes passing around or up through the horse.

The operation of the spraying apparatus is thought to be obvious from the detailed description which has been given above. The can bodies pass through the body maker in the usual manner and solder is applied to the outer face of the can body in the region of the side seam. After leaving the solder roll the can bodies are subjected to a usual wiping roll for removing surplus solder from the outer face of the can body in the region of the side seam. When solder is used of higher melting point than the tin coating covering the plate, this tin coating on the plate is sometimes removed or disturbed during the soldering and wiping of the seam. If there is any disturbance in the coating which might lead to rusting during processing or storing, this is prevented by the improved apparatus described above. Just before the can body leaves the solder horse associated with the soldering mechanism, it passes through the spraying device which sprays a coating of lacquer on the side seam area so that the entire area which might have been disturbed during the soldering and wiping of the can body is covered by this protective coating.

While the invention has been described as particularly useful in connection with the solder bonding of tin-coated plate can bodies, it will be understood that it may also be very useful in connection with the solder bonding and protecting of the side seam area in connection with black plate where lacquer coatings are applied to the plate in the sheet but are disposed so as to leave bare spaces in the region of the side seam to facilitate the solder bonding of the side seam without disturbing the lacquer coating which is applied to the body blank in the sheet. After leaving the solder bath the spray devices described above will spray the area of the can body between the edges of the predecorated or lacquered sheet so that the entire outer surface of the can body will be protected with a lacquer coating.

The reservoir containing the lacquer is adjustable vertically on the standard 32 and is clamped in adjusted position by plates 32a. By adjusting the reservoir the elevation of head of the liquid lacquer level can be varied and this will control the weight of the film deposited on the can bodies.

While two coating nozzles have been described, it is to be understood, of course, that a single nozzle may be used and that many changes in the details of construction and arrangement of parts may be made without departing from the spirit of the invention as set forth in the appended claims.

I claim:

1. In a can body soldering machine having a horse for guiding can bodies with the side seam exposed for treatment, a spray nozzle, means for projecting a spray of lacquer from said nozzle and means for supporting said nozzle at one side of said horse and positioning the same so that the spray jet projected from the nozzle will coat the outer face of the can body at the side of and in the region of the seam opening, said horse at the side opposite the nozzle being cut away so that the spray between passing can bodies will pass into and through the horse without any objectionable coating lodging on the inside of the horse.

2. In a can body soldering machine having a horse for guiding can bodies with the side seam exposed for treatment, a plurality of spray nozzles, means for projecting a spray of lacquer from each nozzle and means for supporting said nozzles relative to said horse so that the sprays projected from said nozzles will coat the outer face of the can body with separate longitudinally extending strips slightly overlapping in the region of the seam opening.

3. In a can body soldering machine having a horse for guiding can bodies with the side seam exposed for treatment, a pair of spray nozzles, means for projecting a spray of lacquer from each nozzle and means for supporting said nozzles at one side of the horse so that the sprays projected from said nozzles will coat the outer face of the can body in separate longitudinally extending strips disposed at opposite sides of and overlapping in the region of the seam opening.

4. In a can body soldering machine having a horse for guiding can bodies with the side seam exposed for treatment, a pair of spray nozzles, means for projecting a spray of lacquer from each nozzle and means for supporting said nozzles at one side of the horse so that the sprays projected from said nozzles will coat the outer face of the can body in separate longitudinally extending strips disposed at opposite sides of and overlapping in the region of the seam opening, said horse being cut away at the side thereof opposite the spray nozzles so that the projected sprays between passing can bodies will pass into and through the horse without any objectionable coating lodging on the inside of the horse.

5. In a can body soldering machine having a horse for guiding can bodies with the side seam exposed for treatment at the lower side thereof, a spray nozzle disposed beneath the horse and at one side thereof, means for projecting a spray of lacquer from said nozzle, said horse at the side opposite the spray nozzle being cut away and provided with spaced guide rods for directing the can body through said cut-away section.

6. In a can body soldering machine having a horse for guiding can bodies with the side seam exposed for treatment at the lower side thereof, a spray nozzle disposed beneath the horse and at one side thereof, means for projecting a spray of lacquer from said nozzle, said horse at the side opposite the spray nozzle being cut away and provided with spaced guide rods for directing the can body through said cut-away section and means for supporting said spray nozzle so that it may be shifted toward and from said horse for projecting a spray of lacquer onto the outer face of the can body at the sides of and in the region of the seam opening.

7. In a can body soldering machine having a horse for guiding can bodies with the side seam exposed for treatment, a spray nozzle, means for projecting a spray of lacquer from said nozzle and means for supporting said nozzle at one side of said horse and positioning the same so that the spray jet projected from the nozzle will coat the outer face of the can body at the side of and in the region of the seam opening, said horse at the side opposite the nozzle being cut away so that the spray between passing can bodies will pass into and through the horse without any objectionable coating lodging on the inside of the horse, means for enclosing said nozzle in a manner for preventing free dispersion of the spray except against the can body in the region of the seam opening and into and through the horse as stated; and means including a duct for taking away spray passing through said horse.

8. In a can body soldering machine having a horse for guiding can bodies with the side seam exposed for treatment at the lower side thereof, a spray nozzle disposed beneath the horse and at one side thereof, means for projecting a spray of lacquer from said nozzle; said horse at the side opposite the spray nozzle being cut away and provided with spaced guide rods for directing the can body through said cut-away section, means for supporting said spray nozzle so that it may be shifted toward and from said horse for projecting a spray of lacquer onto the outer face of the can body at the sides of and in the region of the seam opening, means for enclosing said nozzle in a manner for preventing free dispersion of the spray except against the can body in the region of the seam opening, and into and through the horse as stated, and means including a duct for taking away spray passing through said horse.

RALPH A. LARSON.

REFERENCES CITED

The following references are of record in the file of this patent:

UNITED STATES PATENTS

| Number | Name | Date |
|---|---|---|
| 1,926,465 | Townsend | Sept. 12, 1933 |
| 1,960,725 | Bramsen et al. | May 29, 1934 |
| 2,041,765 | Howell | May 26, 1936 |
| 2,220,107 | Holloway | Nov. 5, 1940 |
| 2,305,387 | Pearson | Dec. 15, 1942 |